US008775224B2

(12) United States Patent
Dinger et al.

(10) Patent No.: US 8,775,224 B2
(45) Date of Patent: Jul. 8, 2014

(54) METHOD AND APPARATUS FOR DYNAMIC SPECIFICATION OF A BUSINESS VALUE BY A DISCOVERED RESOURCE

(75) Inventors: John E. Dinger, Cary, NC (US); James C. Fletcher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1173 days.

(21) Appl. No.: 11/324,895

(22) Filed: Jan. 4, 2006

(65) Prior Publication Data

US 2007/0174149 A1 Jul. 26, 2007

(51) Int. Cl.
*G06Q 10/00* (2012.01)
*G06Q 10/06* (2012.01)

(52) U.S. Cl.
CPC .................................. *G06Q 10/063* (2013.01)
USPC ......................................... 705/7.11; 705/7.36

(58) Field of Classification Search
CPC .......... G06Q 10/063; G06Q 10/06312; G06Q 10/0637
USPC ....................... 705/7, 8, 7.11, 7.36
See application file for complete search history.

(56) References Cited

U.S. PATENT DOCUMENTS

| | | | |
|---|---|---|---|
| 6,347,303 B2 | 2/2002 | Nagai et al. | |
| 7,389,260 B1* | 6/2008 | McLean et al. | 705/36 R |
| 2002/0069102 A1* | 6/2002 | Vellante et al. | 705/10 |
| 2002/0116309 A1 | 8/2002 | Keyes et al. | |
| 2003/0088456 A1* | 5/2003 | Ernest et al. | 705/10 |
| 2004/0002892 A1 | 1/2004 | Gluck et al. | |
| 2004/0088275 A1 | 5/2004 | Elder et al. | |
| 2004/0179528 A1 | 9/2004 | Powers et al. | |
| 2004/0220867 A1* | 11/2004 | Messick et al. | 705/36 |
| 2004/0249937 A1 | 12/2004 | Tachihara et al. | |
| 2005/0028104 A1 | 2/2005 | Apparao et al. | |
| 2005/0043977 A1* | 2/2005 | Ahern et al. | 705/7 |
| 2005/0049882 A1 | 3/2005 | Sawka | |
| 2005/0080696 A1 | 4/2005 | Bagchi et al. | |
| 2005/0119922 A1* | 6/2005 | Eder | 705/7 |
| 2006/0195373 A1* | 8/2006 | Flaxer et al. | 705/35 |

OTHER PUBLICATIONS

Boivie, C. A. Taking stock of your portfolio: Do you have a good idea of the value of your IT applications, both old and new? CIO Canada, 11.10 (Oct. 2003).*

Opsware introduces automated asset discovery and tracking, furthering lead in IT automation. Business Wire [New York] Mar. 9, 2004: 1.*

* cited by examiner

*Primary Examiner* — Timothy Padot
(74) *Attorney, Agent, or Firm* — Jordan IP Law, LLC

(57) ABSTRACT

A method for dynamic specification of a business value by a discovered resource that includes registering or discovering a resource within a business system; specifying a business value for the resource; and then computing a business value of the entire business system, based upon the resource's business value. An apparatus and computer program product that also employs these aspects is disclosed.

21 Claims, 10 Drawing Sheets

METHOD AND APPARATUS FOR DYNAMIC SPECIFICATION OF A BUSINESS VALUE BY A DISCOVERED RESOURCE

BACKGROUND OF THE INVENTION

1. Field of the Invention

The present invention relates generally to business service management. More specifically, the present invention provides a method, apparatus, and computer program product for dynamic specification of a business value by a discovered resource.

2. Background Art

Currently, in the field of business service management there is a subfield, entitled discovery. Discovery is often deployed amongst Information Technology (IT) systems.

In discovery, typically one, or more, types of monitoring software, of middleware, is used to monitor and evaluate various elements, or resources, of an enterprise's IT system including hardware, software, and their relationships. This monitoring, or "viewing", is typically done from the outside looking in. That is the discovery process is conducted wherein a person, or entity, starts with an entire, "macro" view of the IT system, business system, or the like; and, then starts "drilling" down (e.g., analyzing) from the "top" and proceeding downward towards smaller and smaller sub-entities, or resources (e.g., "top-down" analysis).

Typically, in discovery, various resources are "manually" grouped together to form a business unit. The business unit, or business system, is given an arbitrary value by the person, or entity, conducting discovery. This value to the business system may be used later on, if and when there is a failure.

For example, if there is concurrent failure in more than one business system, these arbitrary values are typically applied as the determinant on which business system should be worked on, or corrected, first (i.e., prioritization).

There is currently no way for the various resources to provide their own value as they are deployed into a system, or more than one system. There is a lack of standardization in discovery. Information obtained in discovery is later used to determine business impact of a failure, for example. Currently, business value is provided by the process which defines the elements of the business system, and not by the resource(s) therein.

In view of the foregoing, there exists a need for a method, apparatus, and computer program product for dynamic specification of a business value by a discovered resource.

SUMMARY OF THE INVENTION

In general, the present invention provides a method, apparatus, and computer program product for providing dynamic specification of business value by a discovered resource. The present invention enables the automated discovery and dynamic specifying of resource value as the resources are discovered and/or deployed.

A first aspect of the present invention provides a method for dynamic specification of business value by a discovered resource, comprising: registering or discovering a resource within a business system; specifying a business value for the resource; and computing a business value of the business system, based upon the resource business value.

A second aspect of the present invention provides an apparatus for dynamic specification of business value by a discovered resource, comprising: a device for registering or discovering a resource within a business system; a device for specifying a business value for the resource; and a device for computing a business value of the business system, based upon the resource business value.

A third aspect of the present invention provides a program product stored on a recordable medium for providing dynamic specification of business value by a discovered resource, which when executed comprises: program code for registering or discovering a resource within a business system; program code for specifying a business value for the resource; and program code for computing a business value of the business system, based upon the resource business value.

A fourth aspect of the present invention provides a system for deploying an application for providing dynamic specification of business value by a discovered resource, comprising: providing a computer infrastructure being operable to: register or discover a resource within a business system; specify a business value for the resource; and compute a business value of the business system, based upon the resource business value.

A fifth aspect of the present invention provides computer software embodied in a propagated signal for providing dynamic specification of business value by a discovered resource, the computer software comprising instructions to cause a computer system to perform the following functions: registering or discovering a resource within a business system; specifying a business value for the resource; and computing a business value of the business system, based upon the resource business value.

BRIEF DESCRIPTION OF THE DRAWINGS

These and other features of this invention will be more readily understood from the following detailed description of the various aspects of the invention taken in conjunction with the accompanying drawings in which.

Figure 1:
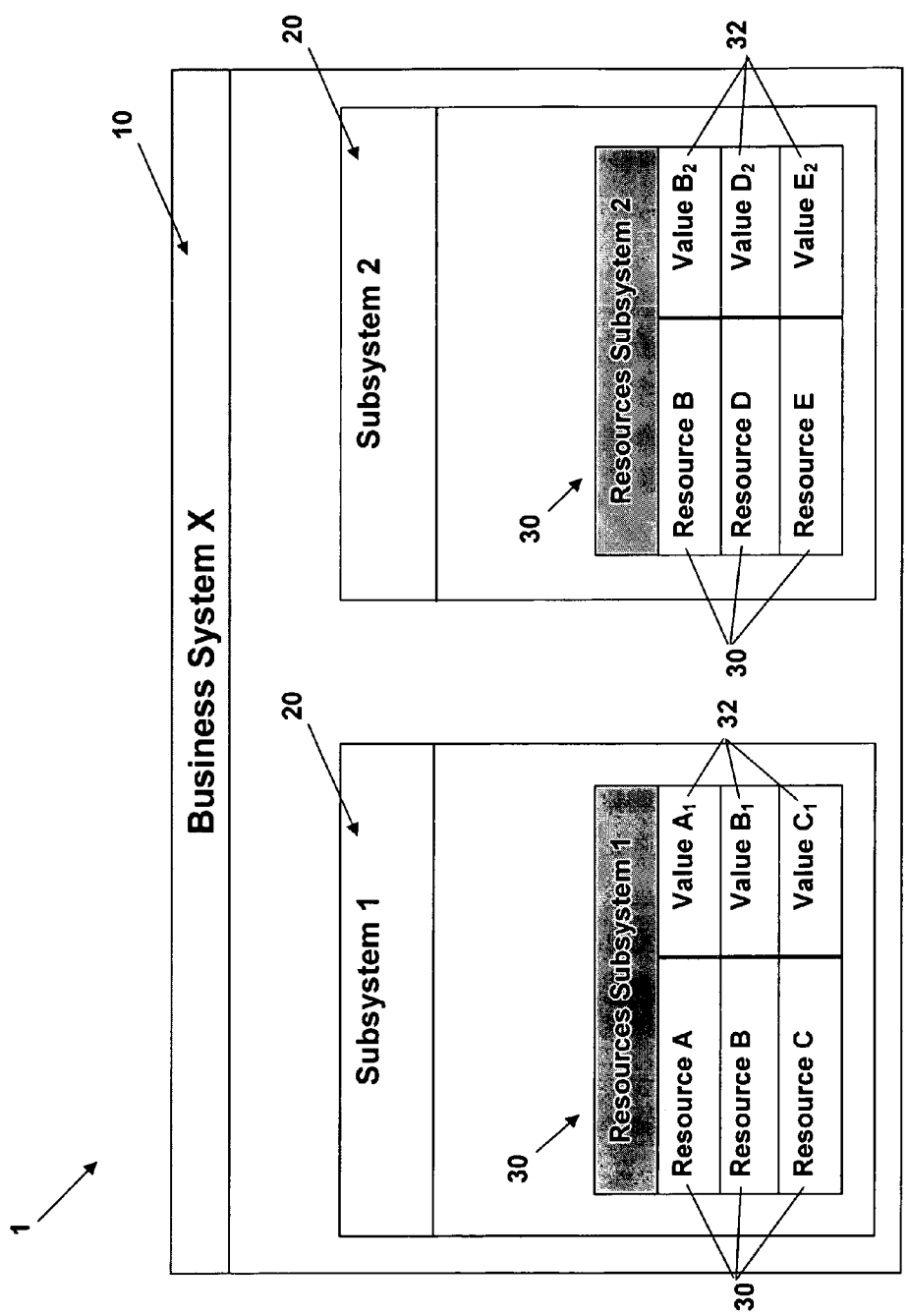
FIG. 1 depicts an illustrative diagram of a business system employing a method for dynamic specification of a business value by a discovered resource, in accordance with the present invention.

The drawings are merely schematic representations, not intended to portray specific parameters of the invention, and are not necessarily to scale. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for providing dynamic specification of business value by a discovered resource Specifically, when a resource is discovered and/or registered, as part of the reporting of its existence and the resource's relationships with other resource(s), a business value metric can be specified for the resource. The business value metric of each resource within a business system may then be used to dynamically compute the overall business value of the business system when the resource, or its interrelated resource(s), is used to compose the business system.

Turning to the figures, FIG. 1 depicts a system 1 having an exemplary business system 10 (e.g., "Business System X"). The business system 10 comprises one, or more, subsystems 20. For example, Business System X 10 comprises two subsystems 20 (e.g., "Subsystem 1" and "Subsystem 2"). Further, each subsystem 20 comprises one, or more, resources 30. The resource(s) 30 associated with, or residing within, a particular subsystem 20 may similarly be also associated with, or reside within, another subsystem(s) 20. For example, "Subsystem 1" 20 has a plurality of resources 30 associated with it. The resources 30 for "Subsystem 1" 20 include "Resource A", "Resource B", and "Resource C". "Subsystem 2" 20 conversely has a plurality of resources 30 associated with it, including "Resource B", "Resource D", and "Resource E". In the example in FIG. 1, "Resource B" 30 is common to both "Subsystem 1" 20 and "Subsystem 2" 20. Conversely, "Resource A" 30 and "Resource C" 30 are only associated with "Subsystem 1" 20, while "Resource D" 30 and "Resource E" 30 are only associated with "Subsystem 2" 20. Clearly, although FIGS. 1 through 4 only depict a single business system 10 (i.e., "Business System X), all salient aspects of the invention may be applied across to multiple business systems 10, as well.

Resource 30 may be any resource 30 used in a business system 10 and/or subsystem 20. Resource 30 may be an IT resource such as software or hardware. Resource 30 may comprise, for example, operating systems, web servers, legacy systems, and the like.

Thus, individual resources 30 (e.g., IT components) may be aggregated to create a subsystem 20. Similarly, individual subsystems 20 may be aggregated to create a business system 10. Multiple business systems 10 (not shown) may make up an entity, corporation, or larger construct.

By employing the method of the present invention, as seen in FIG. 1, for example, each resource 30 is assigned, or given, a value 32. For example, within "Subsystem 1" 20, "Resource A" 30 is assigned "Value $A_1$" 32. Similarly, within "Subsystem 1" 20, "Resource B" 30 is assigned "Value $B_1$" 32, and "Resource C" 30 is assigned "Value $C_1$" 32. So too with "Subsystem 2" 20, "Resource B" 30 is assigned "Value $B_2$" 32. Also within "Subsystem 2" 20, "Resource D" 30 is assigned "Value $D_2$" 32, and "Resource E" 30 is assigned "Value $E_2$" 32. All resources 30 are assigned value, or business values 32. Note too that, for example, although "Resource B" 30 resides both in "Subsystem 1" 20 and "Subsystem 2" 20, it is valued for both subsystems 30. Thus, "Value $B_1$" 32 and "Value $B_2$" 32 need not be the same value. Their respective values 32 depend upon various information including their interrelationships within their respective subsystems 20. Similarly, values 32 may vary depending on differing business systems 10 that a particular resource 30 may further resides in.

Figure 2:
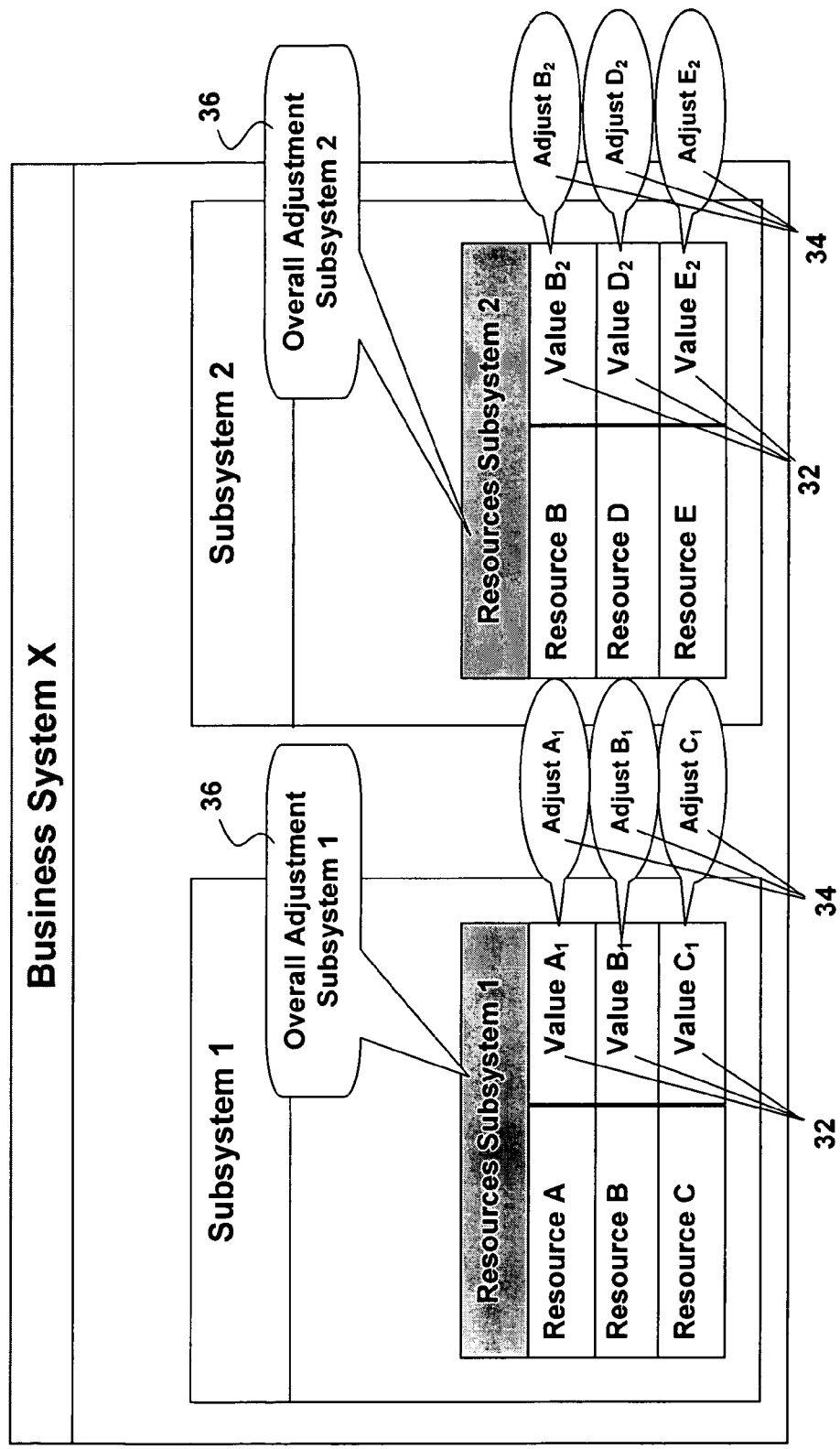
FIG. 2 depicts a view of the business system in FIG. 1 employing a portion of the method, in accordance with the present invention.
Figure 8:
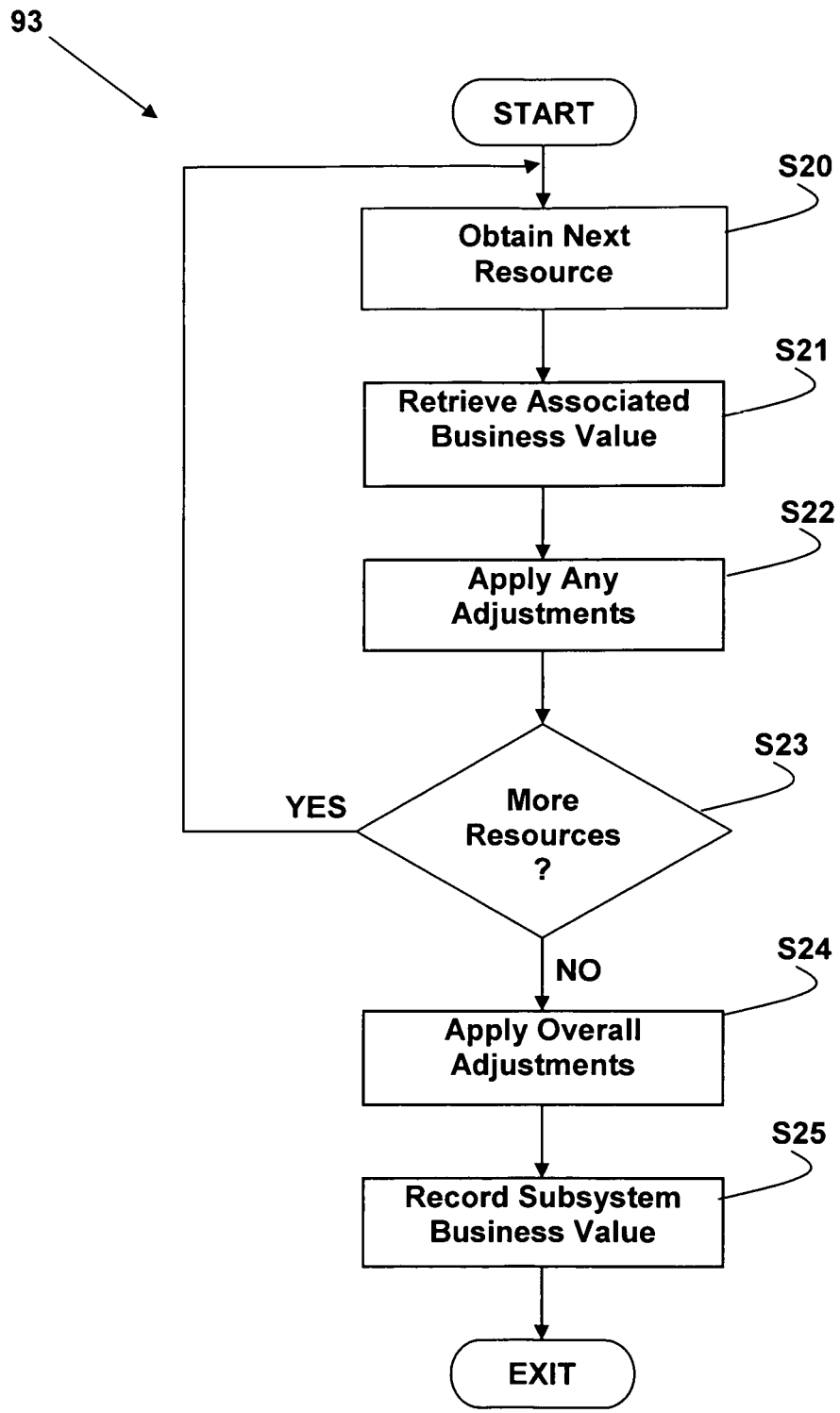
FIG. 8 depicts a flow diagram illustrating a portion of a method in accordance with the present invention.

FIG. 2 depicts part of the method that is also depicted in FIG. 8, wherein after the values 32 are assigned to the various resources 30, any adjustments 34 are applied to the resources 30. For example, "Adjust $A_1$" 34 is applied to "Value $A_1$" 32 for "Resource A" 30. Similarly, "Adjust $B_1$" 34, "Adjust $C_1$" 34, "Adjust $B_2$" 34, "Adjust $D_2$" 34, and "Adjust $E_2$" 34 are applied to the respective values 32 previously assigned to their respective resources 30. A resource 30 may, or may not, have any adjustment 34. However, all resources 30 will have any applicable adjustments 34 applied to their value 32.

Upon the completion of applying any applicable adjustments 34 to the value 32 of resources 30 within a subsystem 20, then the method may apply any overall adjustments 36 to the subsystem 20, as a whole. This results in a business value 22 (FIG. 3) for the entire business subsystem 20. The business value 22 of the subsystem 20 may be recorded. For example, as depicted in FIG. 2, "Overall Adjustment Subsystem 1" 36 is applied to the entire resources 30 of "Subsystem 1" 20, resulting in "Business Value Subsystem 1" 22 (FIG. 3) and "Overall Adjustment Subsystem 2" 36 is applied to the entire resources 30 of "Subsystem 2" 20, resulting in "Business Value Subsystem 2" 22 (FIG. 3).

Figure 3:
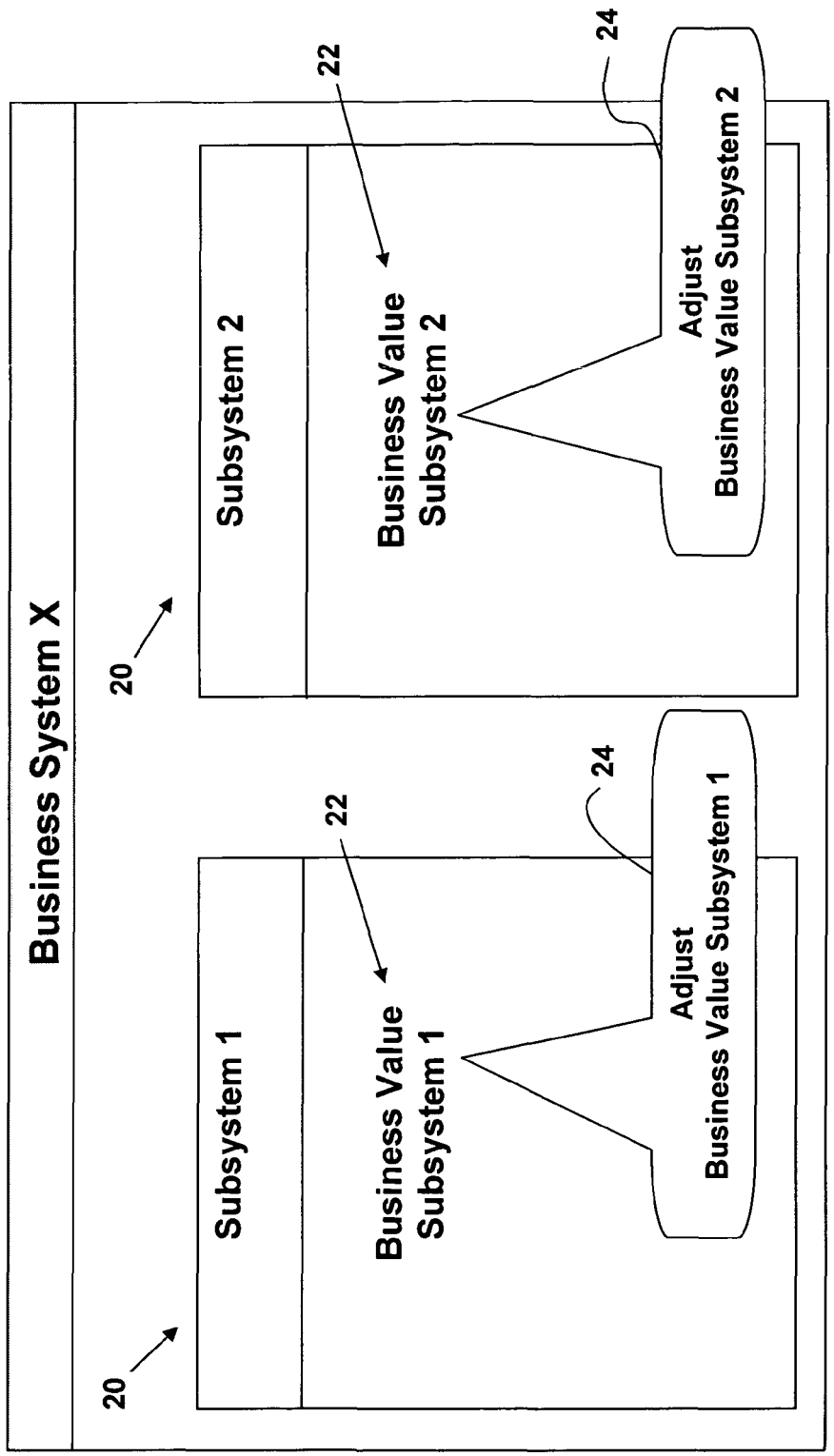
FIG. 3 depicts the view of the business system in FIG. 1 employing a portion of the method, in accordance with the present invention.
Figure 4:
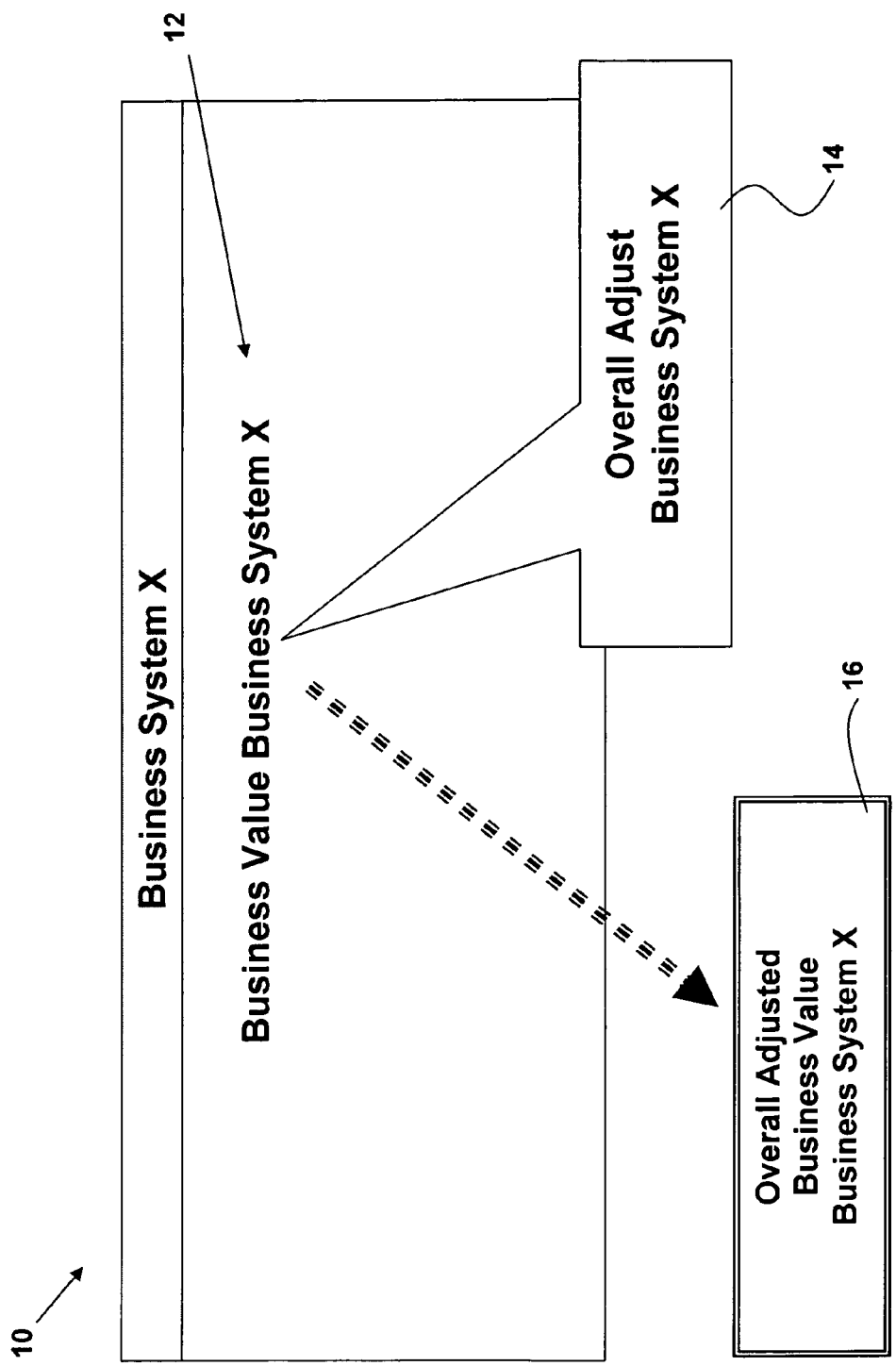
FIG. 4 depicts the view of the business system in FIG. 1 employing a portion of the method, in accordance with the present invention.

FIG. 3 depicts a system diagram showing a portion of the method (FIG. 9) is applied after the business value 22 of a subsystem 20 is established, including the concomitant resources 30, as discussed above. A subsystem 20 is obtained, wherein its associated business value 22 is retrieved. For each subsystem 20 obtained, any adjustments 24 are applied to the business value 22, which in total results in an unadjusted business value 12 for an entire business system 10 (FIG. 4). For example, "Adjust Business Value Subsystem 1" 24 is applied to "Business Value Subsystem 1" 22 of "Subsystem 1" 20. This valuation and adjustment (if applicable) is applied to each and every subsystem 20 in a business system 10.

As FIG. 4 depicts, upon obtaining an unadjusted business value 12 of a business system 10, then the method applies any overall adjustment 14 to the entire business system 10. Ultimately, an Overall Adjusted Business Value 16 for the business system 10 is obtained. The value 16 may be recorded.

In addition to discovering resources 30, as discussed above, resources 30 may be registered. One such technology that may apply this registration process is Configuration Management Database (CMDB). Ultimately, the present invention allows one to specify the value 32 of a resource 30 as the resource 30 is deployed and to further have the value 32 reported as the discovered resource 30 is discovered. If, and when, resources 30 are registered to the CMDB, in lieu of being discovered, the same value 32 may be reported to the CMDB, as well.

Given the value 32 of the resource 30, the overall value 22 of the subsystem 20 may be computed, adjusted and then used to compute the overall business system 10 value 16 based on the value 32 of the individual resources 30 composing that business system 10.

Figure 5:
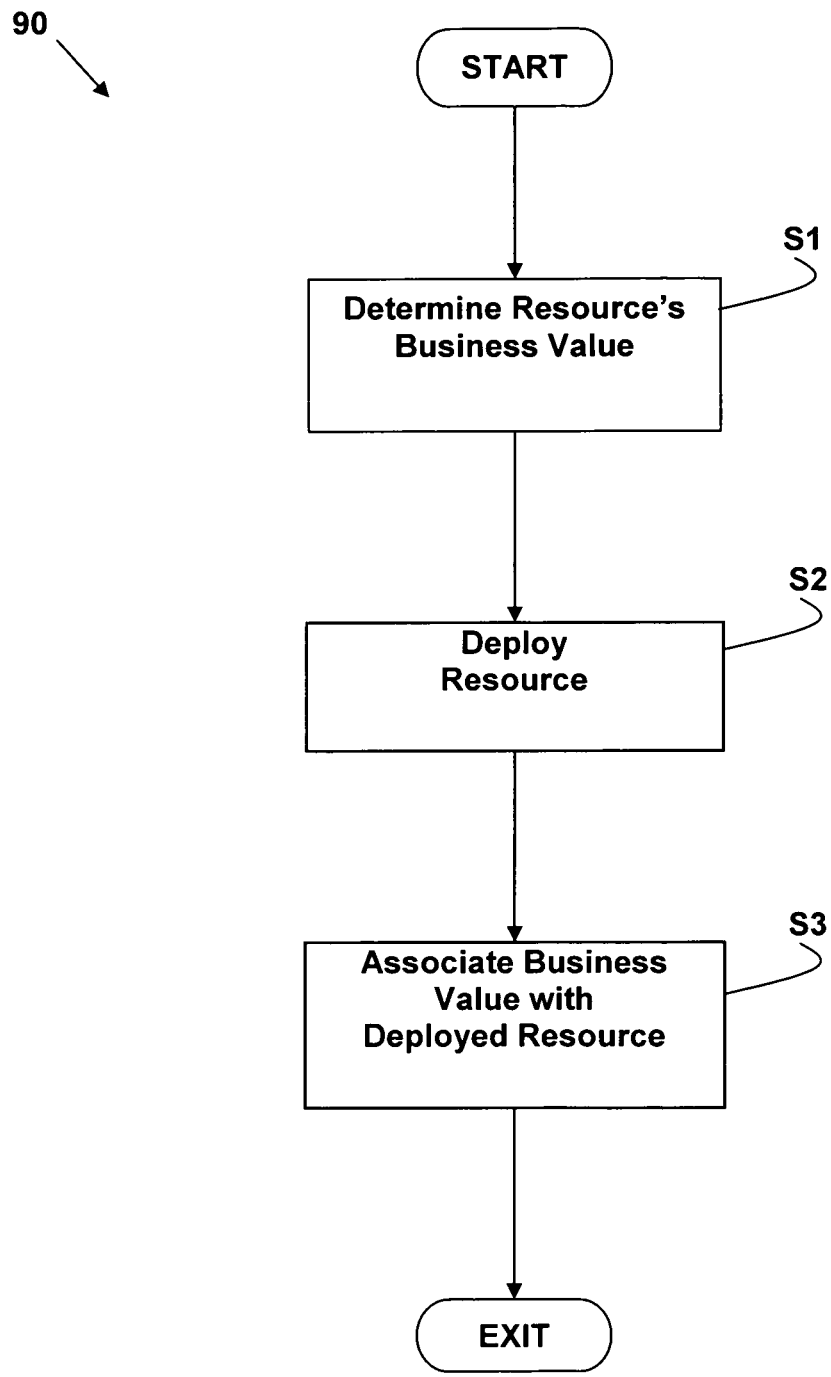
FIG. 5 depicts a flow diagram illustrating a portion of a method in accordance with the present invention.

FIG. 5 depicts a portion of a method, herein denoted 90, of dynamic specification of a business value by a discovered resource. This method 90 may be employed, for example, when an entity is deploying a particular resource(s) 30. For example, a company may be installing a webserver (i.e., resource 30) into their IT system (i.e., business system 10), installing a database (i.e., resource 30) into an IT system (i.e., business system 10), deploying hardware (i.e., resource 30), deploying software (i.e., resource 30) and the like.

The method 90 starts with step S1, wherein the value 32, or business value, for the resource 30 is determined. Subsequently, step S2 is the deployment of the resource 30 into the entity's business system(s) 10. The method concludes with step S3 which is associating the value 32 with the deployed resource 30.

Figure 6:
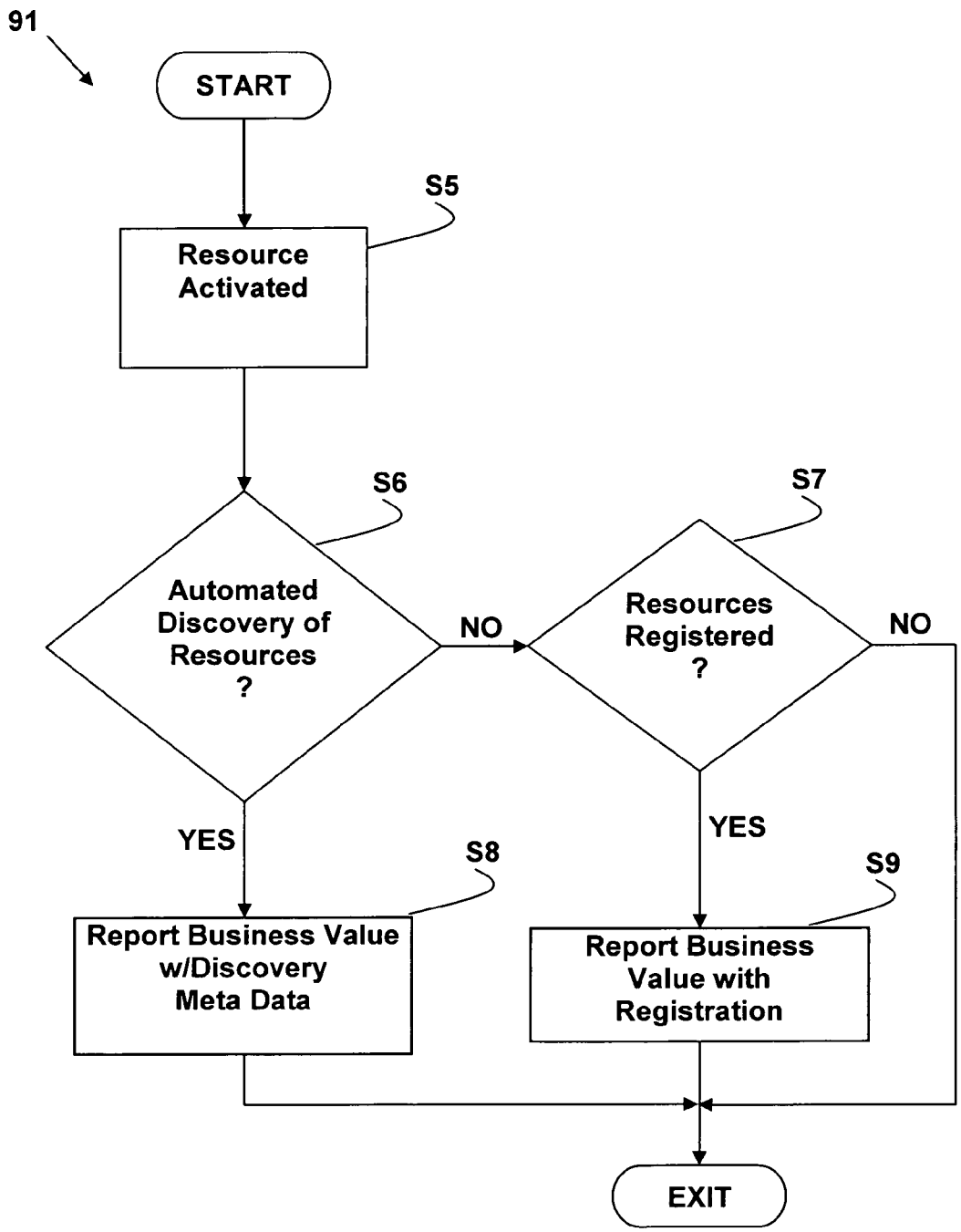
FIG. 6 depicts a flow diagram illustrating a portion of a method in accordance with the present invention.

FIG. 6 depicts a portion of a method, herein denoted 91, of dynamic specification of a business value by a discovered resource. This portion of the method 91 may be employed, for example, when the entity is activating and reporting a value 32 of a particular resource(s) 30.

The method 91 starts with step S5, wherein the resource 30 is activated. Subsequently, step S6 queries whether automated discovery of the resources is being employed. If the query determines that automated discovery is being employed (i.e., step S6 is positive), then step S8 follows to report the business value 32 via discovery as part of meta data of that particular resource 10, thereby concluding method 91. Alternatively, if step S6 is negative, step S7 follows to query if the resource(s) 10 are registered. If the resources are not registered (i.e., step S7 is negative), then the method 91 is concluded. Alternatively, if the resources are registered and/or a registration process is being conducted (i.e., step S7 is positive), then the method 91 proceeds to conclude with step S9 to report the business value 32 of the resource(s) 10 as part of the registration process (not shown).

Figure 7:
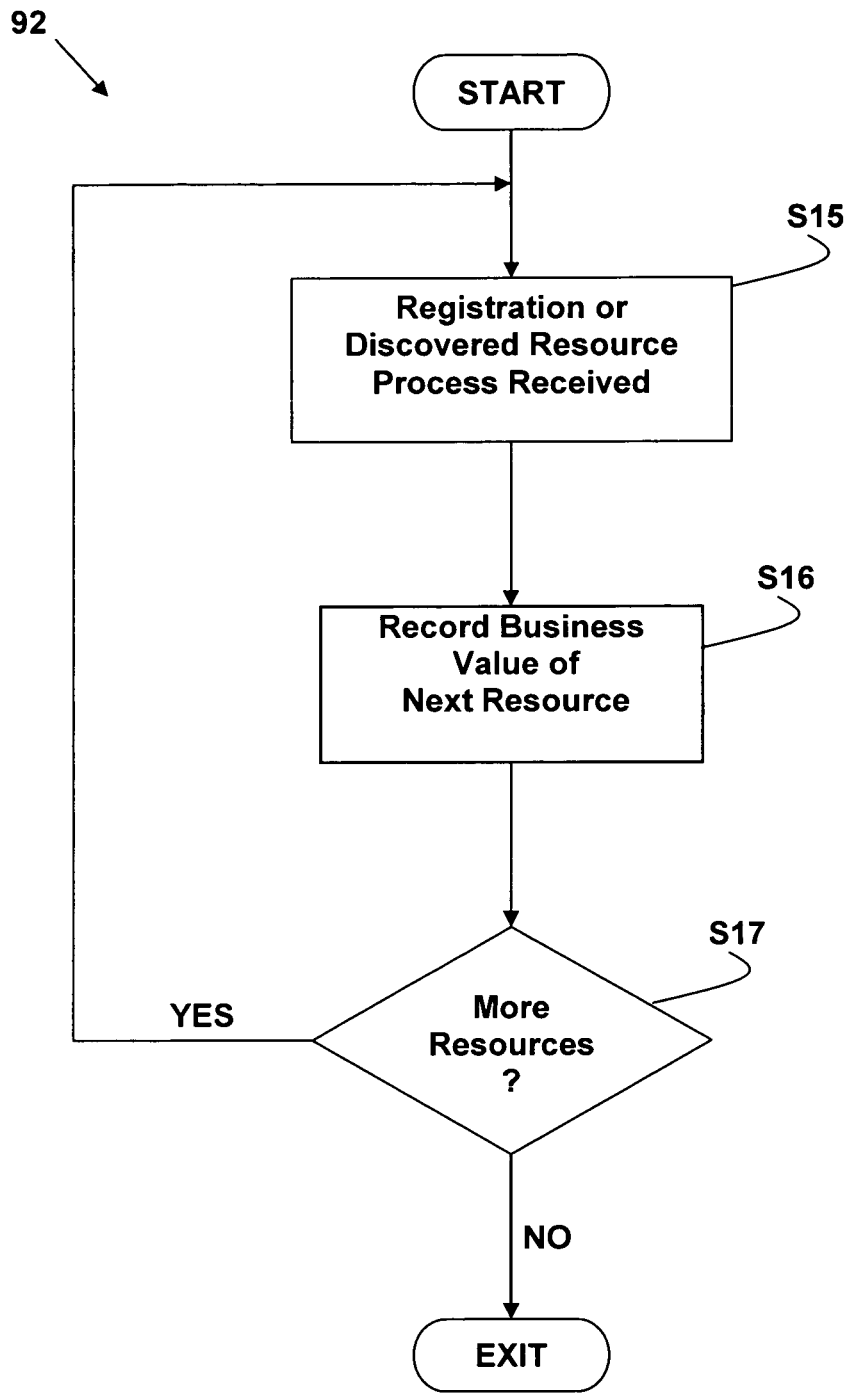
FIG. 7 depicts a flow diagram illustrating a portion of a method in accordance with the present invention.

FIG. 7 depicts a portion of a method, herein denoted 92, of dynamic specification of a business value by a discovered resource. This portion of the method 92 may be employed, for example, when recording a value 32 of a particular resource(s) 30.

The method 92 starts with step S15, wherein the registered or discovered resource 30 is received and processed. Subsequently, step S16 records the value 32, or business value, of the resource 30. The next step in the method 92, is step S17, wherein a query for additional resources 30 is made. If there is an additional or remaining resource 30, then the method 92 loops back to step S15 again and further processing of each and every resource 30. Upon the completion of processing all the resources 30 (i.e., step S17 is negative), then the method 92 concludes.

FIG. 8 depicts a portion of a method, herein denoted 93, of dynamic specification of a business value by a discovered resource. This portion of the method 93 may be employed, for example, to ultimately obtain and record the value, or business value, 22 of the subsystem 20. Thus, method 93 typically may be employed upon the recording of the values 12 of the resources 30 as conducted in method 92, shown in FIG. 7.

The method 93 starts with step S20, wherein the resource 30 is obtained. Subsequently, step S21 retrieves the associated value 32 of the resource 30. The next step in the method 93, is step S22, wherein any adjustments 34 (if applicable) to values 32 to particular resources 30 are made. Step S23 follows to query for additional resources 30. If step S23 is positive, the method 93 repeats back to step S20 to continue processing (via steps S21 and S22) until all resources 30 have been processed.

Upon processing all resources 30 (i.e., step S23 results as negative), step S24 follows. Step S24 applies any overall adjustments 24 (if applicable) to the value of subsystem value 22 thereby resulting in a final subsystem value 22. The method 93 concludes with step S25 which is a recording of the value 22 of the subsystem 20.

Figure 9:
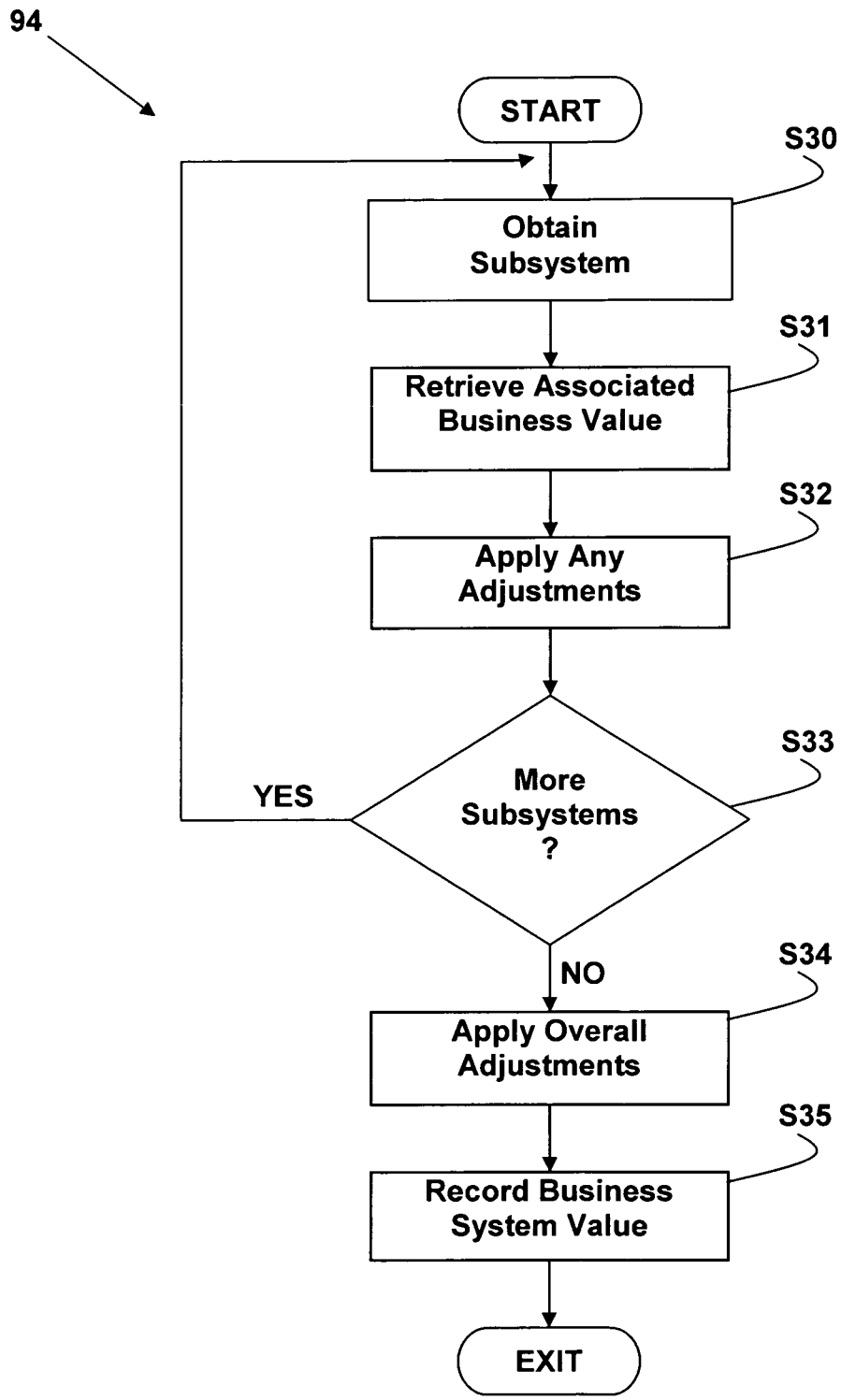
FIG. 9 depicts a flow diagram illustrating a portion of a method in accordance with the present invention.

FIG. 9 depicts a portion of a method, herein denoted 94, of dynamic specification of a business value by a discovered resource. This portion of the method 94 may be employed, for example, to ultimately obtain and record the value, or business value, 12 of the entire business system 10. Thus, method 94 typically may be employed after the employment of method 93, shown in FIG. 8. Method 94 is similar to the method 93 employed for each subsystem 20, with the main distinction being that it is instead employed to an entire business system 10.

The method 94 starts with step S30, wherein the subsystem 20 is obtained. Subsequently, step S31 retrieves the associated value 22 of the subsystem 20. The next step in the method 94, is step S32, wherein any adjustments 24 (if applicable) to values 22 to particular subsystem 20 are made. Step S33 follows to query for additional subsystems 20. If step S33 is positive, the method 94 repeats back to step S30 to continue processing (via steps S31 and S32) until all subsystems 20 have been processed.

Upon processing all subsystems 20 (i.e., step S33 results as negative), step S34 follows. Step S34 applies any overall adjustments 14 (if applicable) to the value of business system value 12 thereby resulting in a final business system value 12. The method 94 concludes with step S35 which is a recording of the value 12 of the subsystem 10.

The present invention ultimately provides the advantage of dynamic specification of a business value by a discovered resource.

Figure 10:
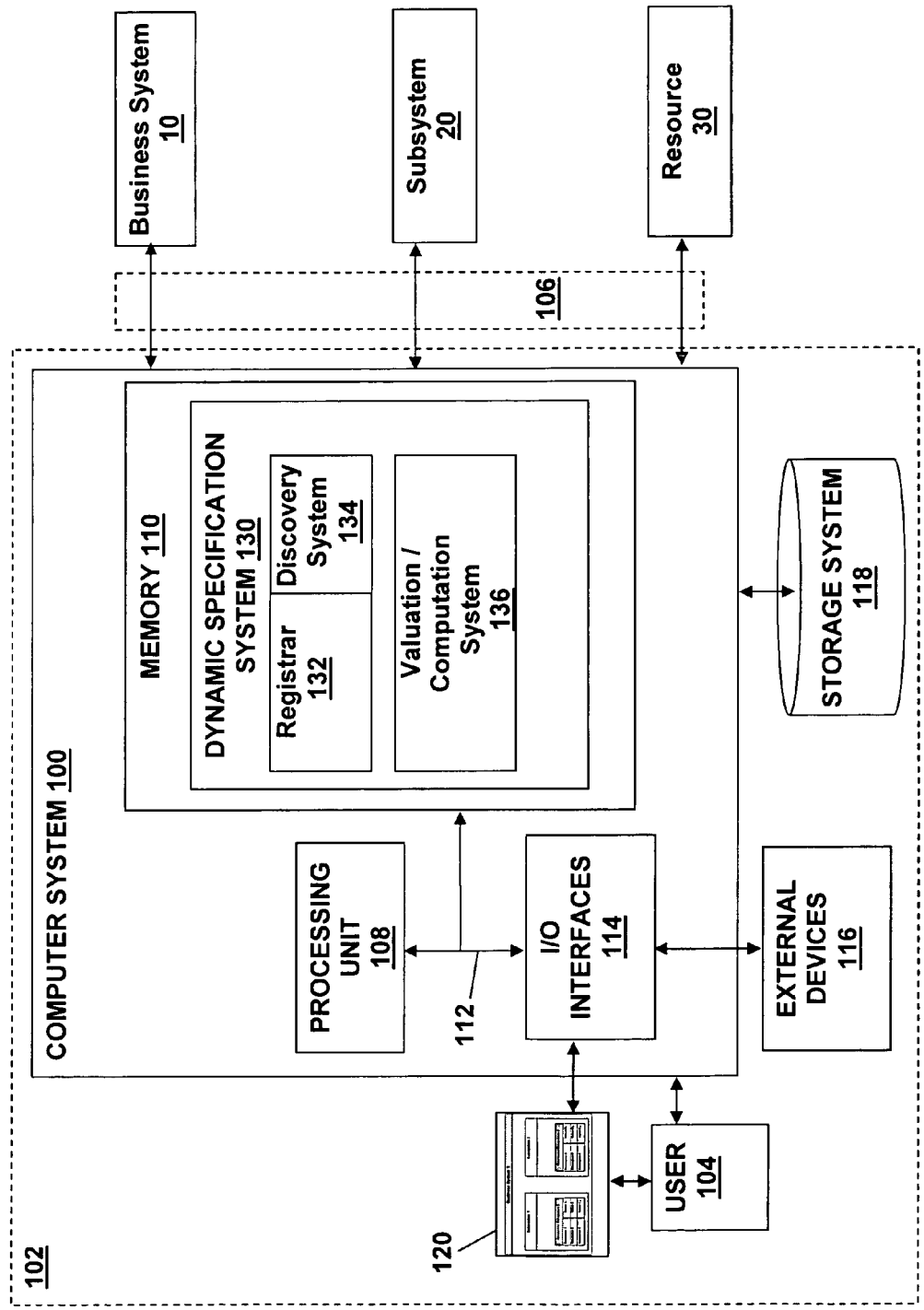
FIG. 10 depicts an apparatus, or computer system, for implementing the method of the present invention.

A computer system, or apparatus, 100 for providing a dynamic specification of a business value by a discovered resource in accordance with an embodiment of the present invention is depicted in FIG. 10. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for dynamic specification of a business value by a discovered resource, in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as a Dynamic Specification System 130, that are stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 10 can be included in computer system 100. However, if computer system 100 comprises a handheld device or the like, it is understood that one or more external devices/resources 116 (e.g., display 120) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 (e.g., e-mail recipient) can contain computerized components similar to those described above with regard to computer system 100.

Shown in memory 110 (e.g., as a computer program product) is a Dynamic Specification System 130 for providing dynamic specification of a business value by a discovered resource in accordance with embodiment(s) of the present invention. The Dynamic Specification System 130 generally includes a Registrar 132 and Discovery System 134 for providing a system for registering resources within a business system and a system for discovering resources within a business system, respectively, as described above. The Dynamic Specification System 130 generally also includes a Valuation/Computation System 136 for both specifying and assigning business values to resources and computing various values, including adjusting of values, of subsystems, business systems, and the like, as described above.

The present invention can be offered as a business method on a subscription or fee basis. For example, one or more components of the present invention can be created, maintained, supported, and/or deployed by a service provider that offers the functions described herein for customers. That is, a service provider can be used to provide a service for providing dynamic specification of a business value by a discovered resource, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for dynamic specification of a business value by a discovered resource, comprising:
   receiving data at an input interface,
   transferring the data to a processor,
   identifying, by the processor using the data, at least one resource within at least one subsystem of a business system, wherein the identifying includes at least one of registering and discovering, and wherein the at least one resource includes at least one of computer hardware and software stored on computer hardware, wherein the registering includes reporting metadata associated with the at least one resource, and the discovering includes referencing a registration process for the at least one resource,
   specifying, by the processor, a business value for the at least one resource in response to the identifying, wherein the business value is particular to the subsystem, is dependent upon the interaction between the at least one resource and at least one other resource in the at least one subsystem, and is particular to the business system in which the at least one resource resides, applying an adjustment to the business value for the at least one resource to obtain an adjusted business value for the at least one resource, storing the adjusted business value for the at least one resource in a storage system, computing, by the processor, a business value for the at least one subsystem as a whole, wherein the business value for the at least one subsystem is dependent upon and is different from the adjusted business value for the at least one resource, applying an adjustment to the business value for the at least one subsystem to obtain an adjusted business value for the at least one subsystem, computing, by the processor, a business value of the entire business system, wherein the business value of the entire business system is based upon and is different from the adjusted business value for the at least one subsystem, and applying an adjustment to the business value of the business system to obtain an overall adjusted business value for the business system.

2. The method of claim 1, further comprising: reporting the overall adjusted business value of the system.

3. The method of claim 1, wherein a plurality of resources are aggregated within the subsystem.

4. The method of claim 1, further comprising: deploying a resource.

5. The method of claim 1, wherein the specifying is done in response to the deploying.

6. The method of claim 1, wherein the resource is one selected from the group consisting of: hardware, software, operating system, web server, legacy system, and combinations thereof.

7. The method of claim 1, wherein the business system is an Information Technology (IT) system.

8. The method of claim 1, where the specifying further comprises: locating and determining relationship between at least two resources.

9. The method of claim 1, further including storing, in a database, at least one of the overall adjusted business value of the business system and the adjusted business value of the at least one resource.

10. An apparatus for providing a dynamic specification of a business value by a discovered resource, comprising:

a device configured for identifying a plurality of resources within at least one subsystem of a business system, wherein the identifying includes at least one of registering and discovering, wherein the registering includes reporting metadata associated with the at least one resource, and the discovering includes referencing a registration process for the at least one resource, and wherein the plurality of resources include at least one of computer hardware and software stored on computer hardware, a device configured for specifying a business value for the at least one resource in response to the identifying, wherein the business value is particular to the subsystem, is dependent upon the interaction between the at least one resource and at least one other resource in the at least one subsystem, and is particular to the business system in which the at least one resource resides, a device configured for applying an adjustment to the business value for the at least one resource to obtain an adjusted business value for the at least one resource, and a device configured for computing a business value for the at least one subsystem as a whole, wherein the business value for the at least one subsystem is dependent upon and is different from the adjusted business value of for the at least one resource, and computing a business value of the entire business system, wherein the business value of the entire business system is based upon and is different from the business value for the at least one subsystem.

11. The apparatus of claim 10, further comprising: a device for reporting the business value of the business system.

12. The apparatus of claim 10, wherein a plurality of resources are aggregated within the subsystem.

13. The apparatus of claim 10, further comprising: a device for deploying a resource.

14. The apparatus of claim 13, wherein the specifying device acts in response to the deploying device.

15. The apparatus of claim 10, wherein the resource is one selected from the group consisting of: hardware, software, operating system, web server, legacy system, and combinations thereof.

16. The apparatus of claim 10, wherein the business system is an Information Technology (IT) system.

17. The apparatus of claim 10, where the specifying device further comprises: a device for locating and determining relationship between at least two resources.

18. The apparatus of claim 10, wherein a plurality of business values are to be computed for a plurality of subsystems each as a whole, wherein each of the plurality of business values for each of the plurality of subsystems is dependent upon and is different from the adjusted business value for the at least one resource within each of the plurality of subsystems.

19. The apparatus of claim 18, wherein the business value of the entire business system is to be based upon the plurality of business values for the plurality of subsystems.

20. A computer program product comprising:

a non-transitory computer readable storage medium, and computer usable code stored on the non-transitory computer readable storage medium, where, if executed by a processor, the computer usable code causes a computer to perform a method comprising:

identifying at least one resource in a plurality of resources within at least one subsystem of a business system, wherein the identifying includes at least one of registering and discovering, and wherein the registering includes reporting metadata associated with the at least one resource, and the discovering includes referencing a registration process for the at least one resource, specifying a business value for the at least one resource in response to the identifying, wherein the business value is particular to the subsystem, is dependent upon the interaction between the at least one resource and at least one other resource in the at least one subsystem, and is particular to the business system in which the at least one resource resides, applying an adjustment to the business value for the at least one resource to obtain an adjusted business value for the at least one resource, computing a business value for the at least one subsystem as a whole, wherein the business value for the at least one subsystem is dependent upon and is different from the adjusted business value of the at least one resource, applying an adjustment to the business value for the at least one subsystem to obtain an adjusted business value for the at least one subsystem, computing a business value of the entire business system, wherein the business value of the entire business system is based upon and is different from the adjusted business value for the at least one subsystem, and applying an adjustment to the business value of the business system to obtain an overall adjusted business value for the business system.

21. An apparatus for providing a dynamic specification of a business value by a discovered resource, comprising:

means for identifying a plurality of resources within at least one subsystem of a business system, wherein the identifying includes at least one of registering and discovering, wherein the registering includes reporting metadata associated with the at least one resource, and the discovering includes referencing a registration process for the at least one resource, and wherein the plurality of resources include at least one of computer hardware and software stored on computer hardware;

means for specifying a business value for the at least one resource in response to the identifying, wherein the business value is particular to the subsystem, is dependent upon the interaction between the at least one resource and at least one other resource in the at least one subsystem, and is particular to the business system in which the at least one resource resides;

means for applying an adjustment to the business value for the at least one resource to obtain an adjusted business value for the at least one resource; and means for computing a business value for the at least one subsystem as a whole, wherein the business value for the at least one subsystem is dependent upon and is different from the adjusted business value of for the at least one resource, and computing a business value of the entire business system, wherein the business value of the entire business system is based upon and is different from the business value for the at least one subsystem.

* * * * *